UNITED STATES PATENT OFFICE.

FRANKLIN M. BUELL, OF TRUXTON, NEW YORK.

IMPROVED ROOFING-CEMENT.

Specification forming part of Letters Patent No. 56,363, dated July 17, 1866.

*To all whom it may concern:*

Be it known that I, FRANKLIN M. BUELL, of Truxton, in the county of Cortland and State of New York, have invented a new and useful Composition for Roofing and other Purposes; and I do hereby declare the following to be a full and exact description thereof.

The nature of my invention consists in the admixture of finely-pulverized sand with coal or gas tar in the composition of a water-proof paint and cement.

I take ordinary sand, free from earthy matters, and reduce it as nearly as possible to an impalpable powder, using for the purpose a common grain or plaster mill, or such other forms of machinery as are used in the reduction of precious ores to the fine condition required in their amalgamation. This finely-powdered sand constitutes the body of my paint or composition, and I prepare it for use by mixing therewith cheap refuse coal-tar, such as may be obtained from any gas-works, using sufficient tar to reduce the mass to the proper consistency for the special purpose to which it is to be applied—either as a paint, to be laid on with a brush, or as a cement for floors, cisterns, &c.

I am aware that sand in its natural condition has been heretofore made an ingredient in compositions for roofing and other purposes; but in no instance has it proved of practical value from its lack of cohesiveness. The granular spherical condition of the particles prevents a firm, intimate union between them and a perfect combination with the tar, by which a bond could be formed. In experiments, however, I have found that by pulverizing the sand and reducing it to a flour I so change its character as that it produces, in combination with the tar, a composition of remarkable tenacity, of a smooth, even body, capable of being reduced to such a consistency as to make an excellent paint.

I contemplate adding such other ingredients to my composition of prepared sand and coal-tar as may, under certain conditions, be required to give it peculiar characteristics—as, for instance, resins, lime, &c.—although for all ordinary purposes I prefer the composition in its simple form. When properly mixed it may be applied with a brush as a paint, or, when made so thick as to become a cement, with a trowel.

In the construction of new roofs I prefer to cover the wood with a layer of straw-paper and of felting, and then to apply the composition to the outer sheet. By thus interposing a thickness of paper or felt between the composition and the wood-work all danger of its cracking and breaking from the swelling or shrinking of the wood is obviated.

In covering old roofs the composition may be applied directly to the shingles or metal.

When dry the composition forms a hard perfectly water and fire proof coating. Its cheapness makes it especially available in protecting fence and telegraph posts from decay, and it supplies an excellent substitute for cement in covering floors, cisterns, &c.

Having fully described my invention, I claim and desire to secure by Letters Patent—

As a new article of manufacture and sale, the paint or composition which I have herein described.

As witness my hand this 5th day of May, A. D. 1866.

FRANKLIN M. BUELL.

In presence of—
JOHN O. WICKS,
H. J. BOSWORTH.